Patented Oct. 9, 1951

2,570,512

UNITED STATES PATENT OFFICE 2,570,512

MANUFACTURE OF DIALKYL HYDROGEN PHOSPHITES

Herman S. Bloch, Chicago, Ill., assignor to Universal Oil Products Company, Chicago, Ill., a corporation of Delaware No Drawing. Application March 26, 1949,
Serial No. 83,759

7 Claims. (Cl. 260—461)

This invention relates to the manufacture of organic intermediates and more particularly to the production of dialkyl hydrogen phosphites which are useful as intermediates in the synthesis of other organic phosphorus compounds.

An object of this invention is to manufacture dimethyl hydrogen phosphite.

Another object of this invention is a method of controlling the temperature of the reaction between phosphorus trichloride and methanol to produce dimethyl hydrogen phosphite.

One specific embodiment of this invention relates to a process for producing dimethyl hydrogen phosphite which comprises reacting methanol and phosphorus trichloride in the presence of a liquid butane, controlling the reaction temperature by vaporization of a portion of said butane, separating hydrogen chloride, methyl chloride and butane from the other reaction products comprising essentially dimethyl hydrogen phosphite and higher boiling products, and fractionally distilling said other reaction products to recover substantially pure dimethyl hydrogen phosphite.

The reaction of methanol with phosphorus trichloride for the purpose of making dimethyl hydrogen phosphite according to the equation:

$PCl_3 + 3CH_3OH \rightarrow HPO(OCH_3)_2 + CH_3Cl + 2HCl$ is characterized by two factors which make it difficult to obtain good yields of the desired product; (a) the reaction is vigorous and highly exothermic; and (b) at temperatures much above 0° C. the desired product reacts with hydrogen chloride to form methyl chloride. It is, therefore, necessary to carry out the reaction (1) at a low temperature; (2) in such a manner that the heat of reaction is easily and quickly dissipated, and not allowed to accumulate even locally; and (3) under conditions such that the hydrogen chloride is rapidly carried from the system.

The present invention accomplishes the above indicated objectives by carrying out the reaction of phosphorus trichloride with methanol in the presence of butane as an internal diluent-refrigerant, preferably employing an amount of butane such that at the conclusion of the reaction an amount of butane will remain at least equivalent to about 1.5 volumes per volume of the butane-soluble components of the system.

This use of butane offers a number of advantages: (1) since n-butane boils at about 0° C. (the desired reaction temperature) the system can be operated under butane reflux and the temperature automatically regulated thereby; or sufficient butane can be initially employed to carry off the heat of reaction by vaporization of the butane, without reflux, while still leaving a sufficient butane excess for dilution purposes; (2) since only one of the reactants (PCl₃) is readily soluble in butane at the reaction temperature (methanol is only slightly soluble in butane at 0° C.), the dilution of this reactant and the dispersal of the second in the butane solution will serve to prevent excessive localized reaction; (3) the use of an internal refrigerant will prevent the build-up of localized heat; (4) the removal of the reaction heat by butane vaporization will cause the rapid removal of hydrogen chloride vapors with the butane vapors; (5) since the desired product, dimethyl hydrogen phosphite, is insoluble in butane, it will leave the reaction phase as rapidly as it is formed, thus minimizing possible over-reaction with the phosphorus trichloride dissolved in the butane; and (6) the butane phase keeps the viscosity of the reaction mixture low and promotes good mixing of the reactants with low power consumption.

The process may be carried out by using batch-type or continuous-type operation. In a typical batch-type operation, a suitable reactor provided with mechanical mixing means is charged with precooled methanol and a precooled solution of phosphorus trichloride in butane (normal butane, isobutane, or a mixture of the two) is added thereto with mixing. The hydrogen chloride and methyl chloride formed as by-products of this reaction in which dimethyl hydrogen phosphite and higher boiling products are formed, are carried continuously from the resultant reaction mixture by butane vapors formed by evaporation of a portion of the butane diluent in which the dimethyl hydrogen phosphite is soluble to only a limited extent. The reaction zone is maintained at a temperature corresponding to the boiling point of the butane diluent at an absolute pressure of one atmosphere, but this operation may be varied to maintain a temperature of from about −20° C. to about 0° C. by reducing the pressure below one atmosphere as to about 0.25 atmosphere absolute and by a proper choice of the butane isomer or mixture, or this operating temperature may be increased to about 10° C. by imposing upon the reaction mixture a slight superatmospheric pressure which is generally not more than about three atmospheres. At the end of such a reaction treatment, the resultant mixture of dimethyl hydrogen phosphite and higher boiling compounds from which the hydrogen chloride and methyl chloride have been removed by the above indicated stripping with butane is then directed to a fractionator which is generally operated at a pressure of less than one atmosphere absolute in order to separate the desired dimethyl hydrogen phosphite from higher boiling by-products.

It is generally preferable to carry out the process in a continuous manner. For example, by this method of treatment a precooled mixture of phosphorus trichloride and butane is mixed continuously with precooled methanol or with a precooled mixture of methanol and butane in a suitable reaction zone provided with means for effecting intimate mixing of the reactants and also additional means for rapidly separating hydrogen chloride or a mixture of hydrogen chloride and methyl chloride from the dimethyl hydrogen phosphite and other products formed in the process. This removal of hydrogen chloride and methyl chloride from the reaction products may be effected by the stripping action of butane vapors produced by evaporation of a portion of the butane diluent. The butane thus serves not only as a stripping medium but it also serves as a temperature control means by reason of the latent heat of vaporization of the butane which thus maintains the reaction mixture at approximately the boiling point of the butane or butane mixture so utilized as a diluent. The reaction mixture formed in the process is then directed continuously to a stripping zone in which the hydrogen chloride and methyl chloride are removed from a mixture of dimethyl hydrogen phosphite and higher boiling products and the last-named products and dimethyl hydrogen phosphite are withdrawn continuously from the stripping zone and directed to a fractionator in order to separate the dimethyl hydrogen phosphite from higher boiling products. This fractionation is generally carried out at a subatmospheric pressure in order to prevent overheating of the dimethyl hydrogen phosphite and other products which are unstable at high temperatures and undergo decomposition when superheated.

Although the process as generally carried out utilizes three molecular proportions of methanol per molecular proportion of phosphorus trichloride as indicated in the foregoing equation, it may sometimes be desirable to employ a molar excess of the methanol in order to insure complete utilization of phosphorus trichloride. Methanol which would then remain unchanged in the reaction products could be recovered therefrom by suitable means and recycled to the reaction zone.

Although this process has been particularly described in connection with the production of dimethyl hydrogen phosphite from methanol, it is also adapted to the production of higher dialkyl hydrogen phosphites from the corresponding higher homologues of methanol, particularly alkanols having not more than about 5 carbon atoms per molecule.

The following examples illustrate results obtainable in this process although they should not be construed to limit unduly the broad scope of the invention.

Example I

To a well-stirred mixture of 320 g. (10 moles) of anhydrous methanol and an equal volume (400 ml.) of butane contained in a flask fitted with a dropping funnel, a mercury-seal stirrer, and a condenser maintained at −20° C. by a circulating refrigerated ethylene glycol-water coolant mixture, is slowly added a solution of 413 g. (3 moles) of phosphorus trichloride in 265 ml. of butane. The addition takes place during approximately two hours, during which the temperature of the reaction mixture is maintained at approximately 0° C. by refluxing butane. The evolved gases which emerge from the condenser (comprising hydrogen chloride, some methyl chloride, and a small amount of butane) are diluted with a bleed-stream of nitrogen and then passed to a water scrubber to remove hydrogen chloride; the scrubbed gases are then collected during measured periods of time over saturated brine solution for analysis.

After the addition of phosphorus trichloride is completed, the mixture is stirred for an additional hour during which the circulating condenser coolant is shut off, so that some butane, together with methyl chloride and traces of hydrogen chloride, are allowed to evaporate from the reactor. The reactor contents are then transferred to a distillation column, the remaining butane and methyl chloride are removed at atmospheric pressure, the remaining excess methanol is removed at 250 mm. pressure and the residual products are distilled at 6 mm. pressure. The fraction boiling at 37–43° C. at 6 mm. pressure (corresponding to about 162–168° C. at atmospheric pressure) comprised the dimethyl hydrogen phosphite product of the reaction. The yield is 300 g., or 91% of theoretical.

Example II

The reaction is carried out as in Example I, except that circulating water (15° C.) is used as a coolant in the reactor condenser, the entire heat of reaction being absorbed by vaporization of butane, methyl chloride, and hydrogen chloride. The quantities of materials used are the same as in Example I except that 1800 ml. of butane is added with the phosphorus trichloride instead of the 265 ml. used in Example I; and the butane-phosphorus trichloride solution is added during four hours. The products are recovered as in Example I, the yield of dimethyl hydrogen phosphite being 307 g. (93% of the theoretical).

I claim as my invention:

1. A process for producing a dialkyl hydrogen phosphite which comprises reacting an alkanol containing from one to about five carbon atoms per molecule and phosphorus trichloride in the presence of a liquid butane, controlling the reaction temperature by vaporization of a portion of said butane, separating hydrogen chloride, alkyl chloride, and butane from the other reaction products comprising essentially dialkyl hydrogen phosphite and higher boiling products, and fractionally distilling said other reaction products to recover substantially pure dialkyl hydrogen phosphite.

2. A process for producing dimethyl hydrogen phosphite which comprises reacting methanol and phosphorus trichloride in the presence of a liquid butane, controlling the reaction temperature by vaporization of a portion of said butane, separating hydrogen chloride, methyl chloride, and butane from the other reaction products comprising essentially dimethyl hydrogen phosphite and higher boiling products, and fractionally distilling said other reaction products to recover substantially pure dimethyl hydrogen phosphite.

3. A process for producing dimethyl hydrogen phosphite which comprises reacting methanol and phosphorus trichloride in the presence of a liquid butane, maintaining the reaction mixture at a temperature of from about −20° to about 10° C. by vaporization of a portion of said butane, stripping hydrogen chloride and methyl chloride from the resultant reaction products by butane vapors to form a mixture of dimethyl hydrogen phosphite and higher boiling products substantially free from hydrogen chloride, and fractionating said mixture of dimethyl hydrogen phosphite and higher boiling products to separate therefrom substantially pure dimethyl hydrogen phosphite.

4. A process for producing dimethyl hydrogen phosphite which comprises reacting methanol and phosphorus trichloride in the presence of a liquid butane, maintaining the reaction mixture at a temperature of from about −20° to about 10° C. by vaporization of a portion of said butane at an absolute pressure of from about 0.25 to about 3 atmospheres, stripping hydrogen chloride and methyl chloride from the resultant reaction products by butane vapors to form a mixture of dimethyl hydrogen phosphite and higher boiling products substantially free from hydrogen chloride, and fractionating said mixture of dimethyl hydrogen phosphite and higher boiling products to separate therefrom substantially pure dimethyl hydrogen phosphite.

5. A process for producing dimethyl hydrogen phosphite which comprises charging continuously to a reaction zone a precooled mixture of phosphorus trichloride and butane, and precooled methanol, maintaining said reaction zone at a temperature of from about −20° to about +10 C. by continuous vaporization of a portion of said butane at an absolute pressure of from about 0.25 to about 3 atmospheres to form a reaction mixture comprising essentially hydrogen chloride, methyl chloride, dimethyl hydrogen phosphite and higher boiling products in admixture with butane diluent, stripping hydrogen chloride from said reaction mixture by vaporization of said methyl chloride and a portion of said butane to form a mixture of dimethyl hydrogen phosphite and higher boiling products substantially free from hydrogen chloride, subjecting said mixture of dimethyl hydrogen phosphite and higher boiling products to fractional distillation at a subatmospheric pressure to separate therefrom substantially pure dimethyl hydrogen phosphite, and recovering said dimethyl hydrogen phosphite.

6. A process for producing dimethyl hydrogen phosphite which comprises charging continuously to a reaction zone a precooled mixture of phosphorus trichloride and butane, and a precooled mixture of methanol and butane; maintaining said reaction zone at a temperature of from about −20° to about +10° C. by continuous vaporization of a portion of said butane at an absolute pressure of from about 0.25 to about 3 atmospheres to form a reaction mixture comprising essentially hydrogen chloride, methyl chloride, dimethyl hydrogen phosphite and higher boiling products in admixture with butane diluent; stripping hydrogen chloride from said reaction mixture by vaporization of said methyl chloride and butane to form a mixture of dimethyl hydrogen phosphite and higher boiling products substantially free from hydrogen chloride; subjecting said mixture of dimethyl hydrogen phosphite and higher boiling products to fractional distillation at a subatmospheric pressure to separate therefrom substantially pure dimethyl hydrogen phosphite; and recovering said dimethyl hydrogen phosphite.

7. A process for producing dimethyl hydrogen phosphite which comprises charging continuously to a reaction zone a mixture of phosphorus trichloride and butane and a second mixture of methanol and butane, each mixture separately cooled to a temperature of from about −20° to about +10° C.; maintaining said reaction zone at a temperature of from about −20° to about +10° C. by continuous vaporization of a portion of said butane at an absolute pressure of from about 0.25 to about 3 atmospheres to form a reaction mixture comprising essentially hydrogen chloride, methyl chloride, dimethyl hydrogen phosphite and higher boiling products in admixture with butane diluent; stripping hydrogen chloride from said reaction mixture by vaporization of said methyl chloride and a portion of said butane to form a mixture of dimethyl hydrogen phosphite and higher boiling products substantially free from hydrogen chloride; subjecting said mixture of dimethyl hydrogen phosphite and higher boiling products to fractional distillation at a subatmospheric pressure to separate therefrom substantially pure dimethyl hydrogen phosphite; and recovering said dimethyl hydrogen phosphite.

HERMAN S. BLOCH.

REFERENCES CITED

The following references are of record in the file of this patent:

UNITED STATES PATENTS

| Number | Name | Date |
|---|---|---|
| 2,175,509 | Rogers et al. | Oct. 10, 1939 |
| 2,426,691 | Jenkins | Sept. 2, 1947 |